United States Patent
Qiao et al.

(10) Patent No.: US 11,962,396 B2
(45) Date of Patent: Apr. 16, 2024

(54) SATELLITE COMMUNICATION METHOD AND APPARATUS, TERMINAL DEVICE, SATELLITE, AND READABLE STORAGE MEDIUM

(71) Applicant: HUAWEI TECHNOLOGIES CO., LTD., Guangdong (CN)

(72) Inventors: Yunfei Qiao, Hangzhou (CN); Rong Li, Hangzhou (CN); Yu Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 17/570,212

(22) Filed: Jan. 6, 2022

(65) Prior Publication Data

US 2022/0131603 A1    Apr. 28, 2022

Related U.S. Application Data

(63) Continuation of application No. PCT/CN2020/096151, filed on Jun. 15, 2020.

(30) Foreign Application Priority Data

Jul. 8, 2019 (CN) .......................... 201910609440.X

(51) Int. Cl.
    H04B 7/185    (2006.01)
(52) U.S. Cl.
    CPC ..... *H04B 7/18582* (2013.01); *H04B 7/18526* (2013.01); *H04B 7/18534* (2013.01); *H04B 7/18586* (2013.01)

(58) Field of Classification Search
    None
    See application file for complete search history.

(56) References Cited

U.S. PATENT DOCUMENTS

| | | | |
|---|---|---|---|
| 2018/0074208 A1 | | 3/2018 | Ravishankar et al. |
| 2019/0041526 A1* | | 2/2019 | Lucky ..................... G01S 19/27 |

FOREIGN PATENT DOCUMENTS

| | | | |
|---|---|---|---|
| CN | 102565820 | A | 7/2012 |
| CN | 107147707 | A | 9/2017 |
| CN | 107238846 | A | 10/2017 |
| CN | 108702200 | A | 10/2018 |
| CN | 109660293 | A | 4/2019 |

OTHER PUBLICATIONS

ZTE Corporation, Consideration of the cell definition and NTN mobility, RN-1817062 (Year: 2018).*
3GPP TR 38.812, Solutions for NR to support non-terrestrial network (NTN) (Year: 2019).*

(Continued)

*Primary Examiner* — Shripal K Khajuria
(74) *Attorney, Agent, or Firm* — Fish & Richardson P.C.

(57) ABSTRACT

The present disclosure provides example satellite communication method, terminal device, and computer-readable storage medium. One example method includes receiving a first system message sent by a first satellite, where the first system message indicates a mean anomaly of the first satellite at an ephemeris reference time. A topology of a satellite network to which the first satellite belongs is determined based on the first system message.

17 Claims, 7 Drawing Sheets

(56) References Cited

OTHER PUBLICATIONS

3GPP TR 38.821 V0.4.0, (Mar. 2019), "3rd Generation Partnership Project; Technical Specification Group Radio Access Network;Solutions for NR to support non-terrestrial networks (NTN) (Release 16)," Mar. 2019, 45 pages.
3GPP TR 38.821 V0.7.0 (May 2019), "3rd Generation Partnership Project; Technical Specification Group Radio Access Network; Solutions for NR to support non-terrestrial networks (NTN) (Release 16)," May 2019, 86 pages.
Ericsson, "Ephemeris data," 3GPP TSG-RAN WG2 #107bis, Tdoc R2-1912597, Chongqing, China, Oct. 14-18, 2019, 4 pages.
Huawei, HiSilicon, "Discussion on mobility with steerable beams in NTN," 3GPP TSG-RAN WG2 Meeting #108, R2-1915191, Reno, USA, Nov. 18-22, 2019, 3 pages.
Office Action issued in Chinese Application No. 201910609440.X dated May 28, 2021, 19 pages (with English translation).
PCT International Search Report and Written Opinion issued in International Application No. PCT/CN2020/096151 dated Sep. 21, 2020, 16 pages (with English translation).
ZTE Corporation, Sanechips, "Consideration on the cell definition and NTN mobility," 3GPP TSG-RAN WG2 Meeting#104, R2-1817062, Spokane, USA, Nov. 12-16, 2018, 13 pages.

\* cited by examiner

SATELLITE COMMUNICATION METHOD AND APPARATUS, TERMINAL DEVICE, SATELLITE, AND READABLE STORAGE MEDIUM

CROSS-REFERENCE TO RELATED APPLICATIONS

This application is a continuation of International Application No. PCT/CN2020/096151, filed on Jun. 15, 2020, which claims priority to Chinese Patent Application 201910609440.X, filed on Jul. 8, 2019. The disclosures of the aforementioned applications are hereby incorporated by reference in their entireties.

TECHNICAL FIELD

Embodiments of this application relate to communications technologies, and in particular, to a satellite communication method and apparatus, a terminal device, a satellite, and a readable storage medium.

BACKGROUND

Global mobile communication is an important development direction of mobile communication, and satellite communication is an important means for implementing global mobile communication. Satellite communication is communication performed between two or more terminal devices through radio wave forwarding by using an artificial earth satellite as a relay node. Compared with terrestrial communication, satellite communication has advantages of wide coverage, large communication capacity, high transmission quality, convenient and fast networking, easy implementation of a seamless global link, and the like. With satellite communication, users can perform various services such as voice calling, video calling, and video watching in any region around the world. How to implement information exchange between a satellite and a terminal device in satellite communication to make the terminal device learn ephemeris data of the satellite in a timely manner is an important research topic.

A method for exchanging information between a satellite and a terminal device in a conventional technology is mainly a method for exchanging information between a satellite and a terminal device in a global positioning system (GPS). In the GPS, the satellite transmits ephemeris data of the satellite to the terminal device by using a navigation message. Based on the ephemeris data obtained from the navigation message, the terminal device selects an appropriate satellite and captures the selected satellite. A length of each frame of the navigation message is 30 seconds/1,500 bits. To obtain complete ephemeris data, the terminal device needs to continuously listen to the navigation message for more than 750 seconds.

However, in the conventional manner, it takes a relatively long time for the terminal device to obtain the ephemeris data of the satellite, and relatively high overheads are caused. Consequently, requirements of low overheads and a low latency in satellite communication cannot be satisfied.

SUMMARY

Embodiments of this application provide a satellite communication method and apparatus, a terminal device, a satellite, and a readable storage medium, to satisfy requirements of low overheads and a low latency in satellite communication.

According to a first aspect, an embodiment of this application provides a satellite communication method. In the method, a terminal device receives a first system message sent by a first satellite, where the first system message is used to indicate a mean anomaly of the first satellite at an ephemeris reference moment; and after receiving the first system message, the terminal device may determine, based on the first system message, a topology of a satellite network to which the first satellite belongs.

In the foregoing method, the terminal device receives the first system message sent by the satellite according to a preset period, where the system message is used to indicate the mean anomaly of the currently observed satellite at the reference moment; and the terminal device may determine position information of the currently observed satellite and other satellites in the satellite network based on the first system message and ephemeris parameters that do not change and that are pre-stored in the terminal device, so as to obtain the topology of the satellite network. The first system message is only used to indicate the mean anomaly of the currently observed satellite at the reference moment, or in other words, the first system message needs to carry only a relatively small quantity of parameters. Therefore, the terminal device can determine the topology of the satellite network by requiring only a relatively low latency and relatively low overheads, thereby satisfying requirements of a low latency and low overheads of a satellite communications system.

In a possible implementation, the first system message may include an identifier of the first satellite, the ephemeris reference moment, and the mean anomaly of the first satellite at the ephemeris reference moment. The mean anomaly of the first satellite at the ephemeris reference moment can be obtained based on these parameters.

In a possible implementation, the first system message may further include an identifier of a satellite that is currently online and/or an identifier of a satellite that is currently offline.

The identifier of the satellite that is currently online and/or the identifier of the satellite that is currently offline are/is carried in the first system message, so that the terminal device can update a locally stored satellite list based on an identifier of a satellite that has most recently been online and/or an identifier of a satellite that has most recently been offline that are/is carried in the terminal device. In this way, operating statuses of satellites in the locally stored satellite list are the same as actual operating statuses of the satellites, thereby ensuring that the terminal device can normally communicate with the satellites.

In a possible implementation, the terminal device may send a first request message to the first satellite, where the first request message is used to request the first satellite to send the first system message. The first satellite sends the first system message to the terminal device based on the first request message.

In this manner, the terminal device proactively requests the first system message from the first satellite.

In another possible implementation, the first satellite may alternatively proactively send the first request message according to a preset period.

In an optional implementation, the terminal device may control sending of the first request message by using a timer. An initial value of the timer may be indicated by a network device to the terminal device when the terminal device is successfully registered with a network. After the terminal device receives the first system message, the timer resets the initial value, and starts timing. After the timer expires, the terminal device is triggered to send the first request message to the satellite, to request the satellite to send the first system message; and the terminal device terminates the timer. When the terminal device is deregistered from the network, the timer is terminated.

In an optional implementation, before receiving the first system message sent by the first satellite, the terminal device may send a second request message to a second satellite, where the second request message is used to request to obtain ephemeris parameters of the second satellite. Then, the terminal device receives a second system message sent by the second satellite, where the second system message is used to indicate the ephemeris parameters of the second satellite.

The second satellite and the first satellite may be identical or different.

The terminal device may send the second request message to the second satellite when accessing the network for the first time, and receive the second system message sent by the second satellite.

In an optional implementation, the second system message includes a square root of a semi-major axis of an orbit, an eccentricity, an argument of perigee, an orbital plane inclination angle at a reference moment, and a longitude of an ascending node that are of the satellite network.

In an optional implementation, the second system message further includes an identifier of the second satellite, the ephemeris reference moment, and a mean anomaly of the second satellite at the ephemeris reference moment.

According to a second aspect, an embodiment of this application provides a satellite communication method. In the method, a first satellite sends a first system message to a terminal device, so that the terminal device determines, based on the first system message, a topology of a satellite network to which the first satellite belongs, where the first system message is used to indicate a mean anomaly of the first satellite at an ephemeris reference moment.

In an optional implementation, the first system message includes an identifier of the first satellite, the ephemeris reference moment, and the mean anomaly of the first satellite at the ephemeris reference moment.

In an optional implementation, the first system message further includes an identifier of a satellite that is currently online and/or an identifier of a satellite that is currently offline.

In an optional implementation, before sending the first system message to the terminal device, the first satellite may further receive a first request message sent by the terminal device, where the first request message is used to request the first satellite to send the first system message. After receiving the first request message, the first satellite sends the first system message to the terminal device based on the first request message.

In this manner, the first satellite sends the first system message based on a request from the terminal device.

In another possible implementation, the first satellite may alternatively proactively send the first request message according to a preset period.

In an optional implementation, the first satellite may further receive a second request message sent by the terminal device, where the second request message is used to request to obtain ephemeris parameters of a second satellite; and send the second system message to the terminal device based on the second request message, where the second system message is used to indicate the ephemeris parameters of the second satellite.

In this manner, the second satellite and the first satellite are identical.

In an optional implementation, the second system message includes a square root of a semi-major axis of an orbit, an eccentricity, an argument of perigee, an orbital plane inclination angle at a reference moment, and a longitude of an ascending node that are of the satellite network.

In an optional implementation, the second system message further includes an identifier of the second satellite, the ephemeris reference moment, and a mean anomaly of the second satellite at the ephemeris reference moment.

According to a third aspect, an embodiment of this application provides a satellite communications apparatus, where the apparatus includes:

a receiving module, configured to receive a first system message sent by a first satellite, where the first system message is used to indicate a mean anomaly of the first satellite at an ephemeris reference moment; and a processing module, configured to determine, based on the first system message, a topology of a satellite network to which the first satellite belongs.

In an optional implementation, the first system message includes an identifier of the first satellite, the ephemeris reference moment, and the mean anomaly of the first satellite at the ephemeris reference moment.

In an optional implementation, the first system message further includes an identifier of a satellite that is currently online and/or an identifier of a satellite that is currently offline.

In an optional implementation, the apparatus further includes:

a sending module, configured to send a first request message to the first satellite, where the first request message is used to request the first satellite to send the first system message.

In an optional implementation, the apparatus further includes:

a sending module, configured to send a second request message to a second satellite, where the second request message is used to request to obtain ephemeris parameters of the second satellite; and the receiving module is further configured to receive a second system message sent by the second satellite, where the second system message is used to indicate the ephemeris parameters of the second satellite.

In an optional implementation, the second system message includes a square root of a semi-major axis of an orbit, an eccentricity, an argument of perigee, an orbital plane inclination angle at a reference moment, and a longitude of an ascending node that are of the satellite network.

In an optional implementation, the second system message further includes an identifier of the second satellite, the ephemeris reference moment, and a mean anomaly of the second satellite at the ephemeris reference moment.

According to a fourth aspect, an embodiment of this application provides a satellite communications apparatus, where the apparatus includes:

a processing module and a sending module, where
the processing module is configured to send a first system message to a terminal device by using the sending module, so that the terminal device determines, based on the first system message, a topology of a satellite network to which a first satellite belongs, where the first system message is used to indicate a mean anomaly of the first satellite at an ephemeris reference moment.

In an optional implementation, the first system message includes an identifier of the first satellite, the ephemeris reference moment, and the mean anomaly of the first satellite at the ephemeris reference moment.

In an optional implementation, the first system message further includes an identifier of a satellite that is currently online and/or an identifier of a satellite that is currently offline.

In an optional implementation, the apparatus further includes:
  a receiving module, configured to receive a first request message sent by the terminal device, where the first request message is used to request the first satellite to send the first system message; and
  the sending module is specifically configured to send the first system message to the terminal device based on the first request message.

In an optional implementation, the apparatus further includes:
  a receiving module, configured to receive a second request message sent by the terminal device, where the second request message is used to request to obtain ephemeris parameters of a second satellite; and
  the sending module is further configured to send a second system message to the terminal device based on the second request message, where the second system message is used to indicate the ephemeris parameters of the second satellite.

In an optional implementation, the second system message includes a square root of a semi-major axis of an orbit, an eccentricity, an argument of perigee, an orbital plane inclination angle at a reference moment, and a longitude of an ascending node that are of the satellite network.

In an optional implementation, the second system message further includes an identifier of the second satellite, the ephemeris reference moment, and a mean anomaly of the second satellite at the ephemeris reference moment.

According to a fifth aspect, an embodiment of this application provides a terminal device. The terminal device includes a memory, a processor, and a transceiver. The processor is configured to be coupled to the memory, and read and execute instructions in the memory, to implement the steps in the method according to the first aspect. The transceiver is coupled to the processor, and the processor controls the transceiver to perform message receiving and sending.

According to a sixth aspect, an embodiment of this application provides a satellite, including a memory, a processor, and a transceiver. The processor is configured to be coupled to the memory, and read and execute instructions in the memory, to implement the steps in the method according to the second aspect. The transceiver is coupled to the processor, and the processor controls the transceiver to perform message receiving and sending.

According to a seventh aspect, an embodiment of this application provides a computer program product. The computer program product includes computer program code. When the computer program code is executed by a computer, the computer is enabled to perform the method according to the first aspect or the second aspect.

According to an eighth aspect, an embodiment of this application provides a computer-readable storage medium. The computer-readable storage medium stores computer instructions. When the computer instructions are executed by a computer, the computer is enabled to perform the method according to the first aspect or the second aspect.

According to a ninth aspect, an embodiment of this application provides a chip. The chip is connected to a memory, and is configured to read and execute a software program stored in the memory, to implement the method provided in the first aspect or the second aspect.

According to a tenth aspect, an embodiment of this application provides an apparatus, including an input interface circuit, a logic circuit, and an output interface circuit. The logic circuit is configured to perform the method according to the first aspect or the method according to the second aspect.

DESCRIPTION OF EMBODIMENTS

Figure 1:
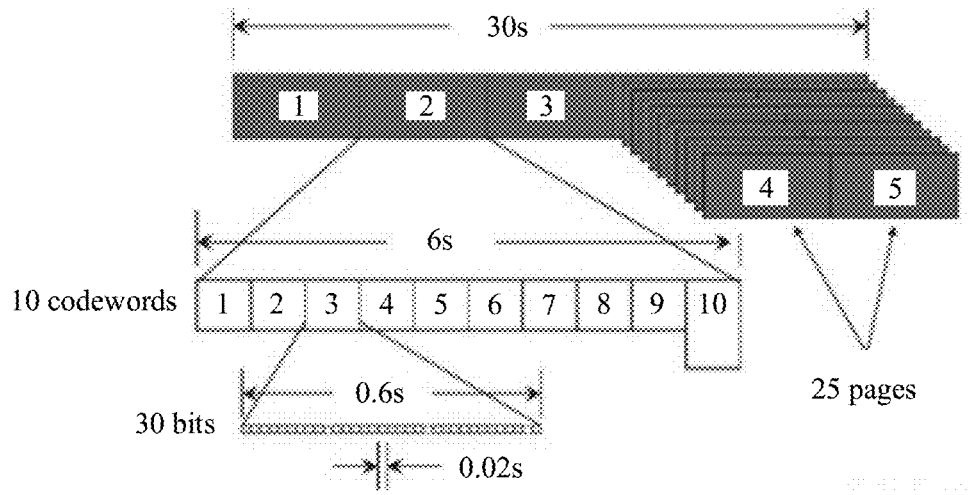
FIG. 1 is a schematic diagram of a structure of a navigation message.

A conventional GPS uses a navigation message as a data base for positioning and navigation. The navigation message is a data code including navigation information such as a satellite ephemeris, a satellite operating status, a time system, a satellite clock operating status, an orbit perturbation parameter, a correction made based on impact caused by atmospheric refraction, and a C/A acquisition code. The navigation message includes a primary frame, a subframe, a codeword, and a page. FIG. 1 is a schematic diagram of a structure of a navigation message. As shown in FIG. 1, a basic unit of the navigation message is a 1500-bit primary frame. One primary frame includes five subframes, where each of the first subframe, the second subframe, and the third subframe includes 10 codewords, each codeword includes 30 bits, and a transmission time of each bit is 0.02 second.

The three subframes are used to broadcast an ephemeris and a clock correction parameter of a satellite. The fourth subframe and the fifth subframe each include 25 pages, each page includes 750 bits, and a transmission time of each bit is 0.02 seconds. The two subframes are used to broadcast almanacs of all 25 satellites. A transmission rate of the navigation message is 50 bits/second, and one primary frame includes 1500 bits. Therefore, a transmission time of one primary frame of the navigation message is 30 seconds. 1500 bits of one primary frame are allocated to five subframes, where 300 bits are allocated to each subframe. Therefore, the first subframe, the second subframe, and the third subframe may be repeated every 30 seconds and updated every hour. Because one primary frame may be used to transmit one page in each of the fourth subframe and the fifth subframe, 25 primary frames are required to transmit the fourth subframe and the fifth subframe. Therefore, one complete navigation message needs to be transmitted by using 25 primary frames. Because a transmission time of each primary frame is 30 seconds, 750 seconds need to be taken to transmit one complete navigation message. For a terminal device, to obtain a complete navigation message, the terminal device needs to continuously listen to the navigation message for at least 750 seconds. In the foregoing process, the terminal device needs to continuously listen to the navigation message for a relatively long time. Therefore, overheads are relatively high. In addition, 750 seconds need to be taken for the terminal device to obtain a history of each satellite. This also causes a relatively high latency.

Figure 2:
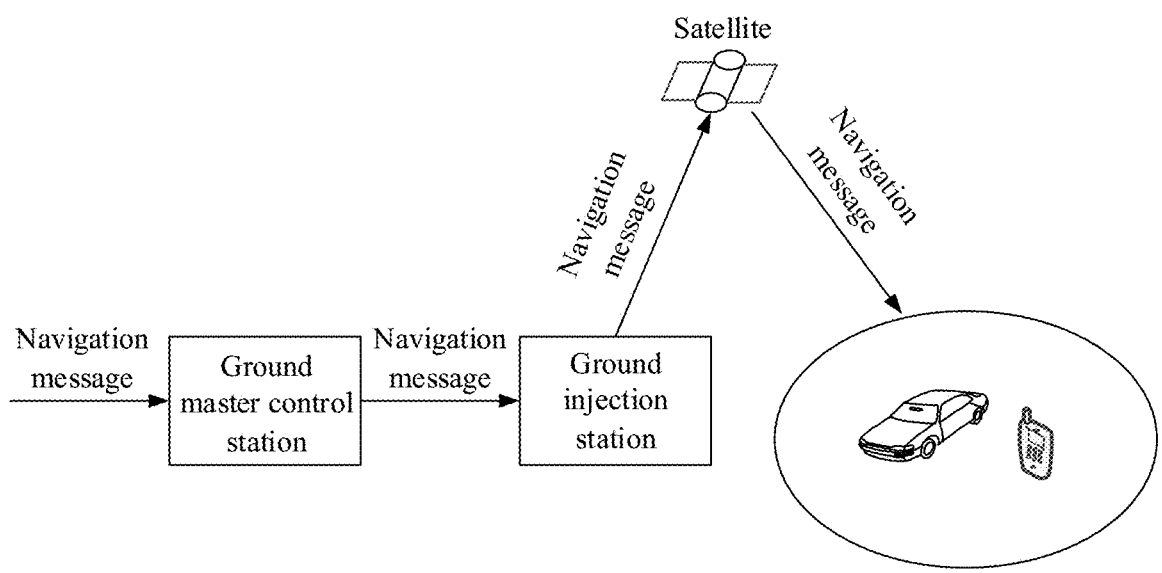
FIG. 2 is a schematic diagram of an application scenario of a GPS.

Main application scenarios of the conventional GPS include accurate positioning and navigation. FIG. 2 is a schematic diagram of an application scenario of a GPS. As shown in FIG. 2, an operator writes a navigation message, and inputs the navigation message into a ground master control station, the ground master control station transmits the navigation message to a ground injection station, and the ground injection station injects the navigation message into a storage system of a satellite. Then, the satellite broadcasts the navigation message to a terminal device in the foregoing manner. The terminal device interprets the navigation message, and obtains information such as a current position and speed through calculation. In the foregoing scenario, accurate positioning and satellite prediction need to be performed. Therefore, the terminal device needs to learn an ephemeris of the satellite and almanacs of all satellites by using the navigation message. The ephemeris of the satellite includes a time parameter, a Keplerian orbit parameter, and an orbit perturbation parameter, and an accurate position of the currently observed satellite may be obtained based on these parameters, so as to implement positioning of the terminal device. The almanacs of all the satellites include basic orbit parameters of all the satellites, and satellite prediction can be performed based on these parameters.

With the continuous development of mobile communications technologies, the satellite can be applied to mobile communication in addition to the GPS system. Such satellite-based mobile communication may be referred to as satellite communication. Like other mobile communication modes, in satellite communication, various services such as voice calling, video calling, and video watching need to be implemented. Therefore, a satellite communications system needs to maintain a relatively low latency and relatively low overheads, to ensure normal operation of the various services. However, because relatively high overheads and a relatively high latency are caused in a method for broadcasting the ephemeris of the satellite and the satellite almanacs in the GPS system by using the navigation message, the method for broadcasting the ephemeris of the satellite and the satellite almanacs in the GPS system is not applicable to the satellite communications system.

In addition, in the satellite communications system, the terminal device obtains the ephemeris of the satellite and the satellite almanacs to mainly determine position information of the currently observed satellite, determine a topology of a satellite network based on the position information, and perform satellite overhead prediction, to perform service data exchange and the like. During determining of the topology of the satellite network, a requirement on accuracy of the position information of the satellite is relatively low, and the topology of the satellite network can still be determined when the accuracy of the position information is relatively low. Therefore, the satellite communications system needs to obtain only necessary ephemeris parameters, and determines the position information of the currently observed satellite based on these parameters, so that the terminal device can determine the topology of the satellite network based on the obtained position information. Moreover, for some satellite networks in which orbital planes are evenly distributed and satellites on the orbital planes are evenly distributed, a position relationship between the satellites is relatively fixed. Therefore, on the basis that the position information of the currently observed satellite is learned, position information of other satellites in the satellite network may be obtained based on the position relationship between the satellites, to further obtain the topology of the satellite network.

Based on the foregoing analysis, an embodiment of this application provides a communication method applied to a satellite communications system. A terminal device obtains only necessary ephemeris parameters, and determines position information of a currently observed satellite and position information of other satellites in a satellite network based on the necessary ephemeris parameters. The terminal device may determine a topology of the satellite network based on the position information of the currently observed satellite and the position information of the other satellites, so as to perform satellite overhead prediction and the like.

Figure 3:
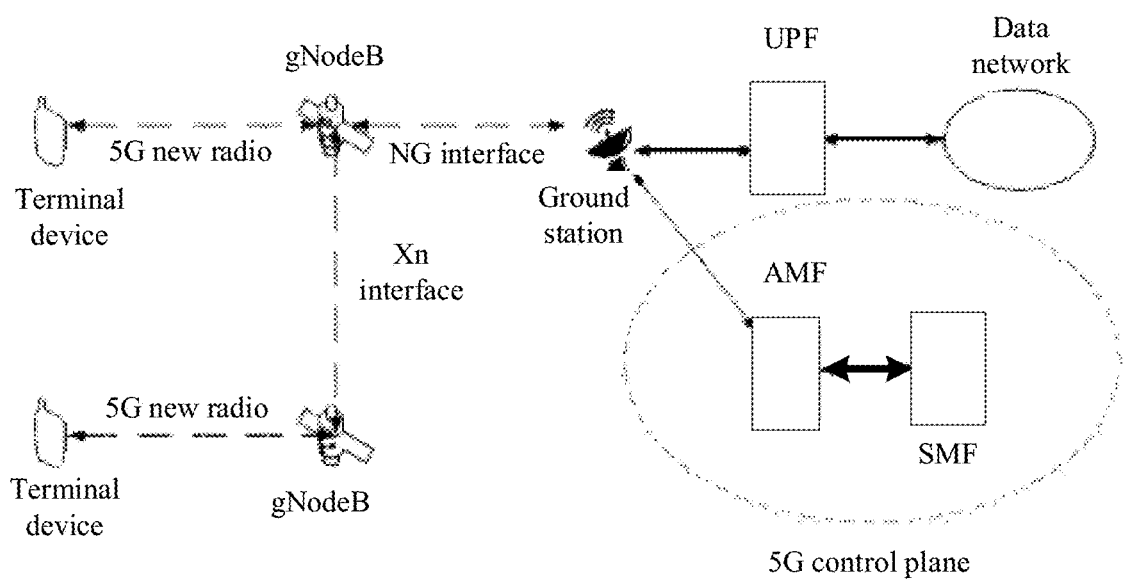
FIG. 3 is a schematic diagram of an example system architecture of a communication method according to an embodiment of this application.

FIG. 3 is a schematic diagram of an example system architecture of a communication method according to an embodiment of this application. It should be noted that FIG. 3 is described by using an example in which a satellite network and a 5G network are converged. However, this does not constitute any limitation on this embodiment of this application. The communication method provided in this embodiment of this application can also be applied to a system in which a satellite network is converged with a 2G network, a 3G network, a 4G network, or the like. As shown in FIG. 3, a system in which the satellite network and the 5G network are converged includes a terminal device, a gNodeB deployed on a satellite, a ground station, and a 5G core network. In the system, the gNodeB is deployed on the satellite in the satellite network, and communicates with the 5G core network on a ground through a radio link, to perform signaling exchange, service data transmission, and the like. There are radio links between various satellites, and signaling exchange and user data transmission between gNodeBs can be implemented through these links.

The terminal device may also be referred to as a terminal, user equipment (UE), a mobile station (MS), a mobile terminal (MT), or the like. The terminal device may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, or the like.

The terminal device communicates, through 5G new radio, with the gNodeB deployed on the satellite.

The gNodeB is mainly configured to provide a radio access service and schedule a radio resource for the accessed terminal device to use. In addition, the gNodeB further provides a reliable wireless transmission protocol, a data encryption protocol, and the like.

It should be noted that, in the system in which the satellite network is converged with the 2G network, the 3G network, the 4G network, or the like, a base transceiver station (BTS) in global system for mobile communications (GSM) or code division multiple access (CDMA), a NodeB in wideband code division multiple access (WCDMA), an evolved NodeB (eNB, or e-NodeB) in LTE, or the like may further be deployed on the satellite.

A radio link may be established between gNodeBs through an Xn interface.

The 5G core network is configured to perform services such as user access control, mobility management, session management, user security authentication, and accounting. The 5G core network includes a plurality of functional units, and these functional units may be classified into a control plane functional entity and a user plane functional entity. The control plane functional entity mainly includes an access and mobility management function (AMF) and a session management function (SMF). The user plane functional entity mainly includes a user plane function (UPF). The AMF is responsible for user access, security authentication, and mobility management. The SMF provides user experience of continuous uninterrupted service. The UPF is responsible for management of user plane data transmission, traffic statistics collection, lawful interception, and the like.

It should be noted that, in the system in which the satellite network is converged with the 2G network, the 3G network, the 4G network, or the like, the foregoing 5G core network may be replaced with a core network in the 2G network, a core network in the 3G network, or a core network in the 4G network.

A radio link may be established between the 5G core network and the gNodeB through an NG interface.

The following embodiments of this application mainly relate to an interaction process between the terminal device and the satellite on which the gNodeB is deployed.

Before the interaction process between the terminal device and the satellite is described, the necessary ephemeris parameters described in the foregoing are first described.

As described above, in the GPS, the ephemeris of the satellite includes the time parameter, the Keplerian orbit parameter, and the orbit perturbation parameter, and the accurate position of the currently observed satellite may be obtained based on these parameters. The time parameter includes an ephemeris reference moment $t_{0e}$; the Keplerian orbit parameter includes a square root $\sqrt{a}$ of a semi-major axis of an orbit, an eccentricity e, an argument ω of perigee, an orbital plane inclination angle $i_0$ at the reference moment, a longitude $\Omega_0$ of an ascending node, and a mean anomaly $M_0$ at the reference moment; and the orbit perturbation parameter includes a corrected value of the mean anomaly, a change rate of the longitude of the ascending node, a change rate of the orbital plane inclination angle, an amplitude of a sine harmonic correction term to an argument of latitude, an amplitude of a cosine harmonic correction term to the argument of latitude, an amplitude of a sine harmonic correction term to the orbital plane inclination angle, an amplitude of a cosine harmonic correction term to the orbital plane inclination angle, an amplitude of a sine harmonic correction term to an orbit radius, and an amplitude of a cosine harmonic correction term to the orbit radius.

In the embodiments of this application, position information of the currently observed satellite and position information of other satellites in a satellite network may be obtained based on the ephemeris reference moment $t_{0e}$ in the time parameter and based on the square root $\sqrt{a}$ of the semi-major axis of the orbit, the eccentricity e, the argument ω of perigee, the orbital plane inclination angle $i_0$ at the reference moment, the longitude $\Omega_0$ of the ascending node, and the mean anomaly $M_0$ at the reference moment that are in the Keplerian orbit parameter. Therefore, in the embodiments of this application, these parameters are referred to as necessary ephemeris parameters. After obtaining these necessary ephemeris parameters, the terminal device may determine the position information of the currently observed satellite and the position information of the other satellites in the satellite network.

Figure 4:
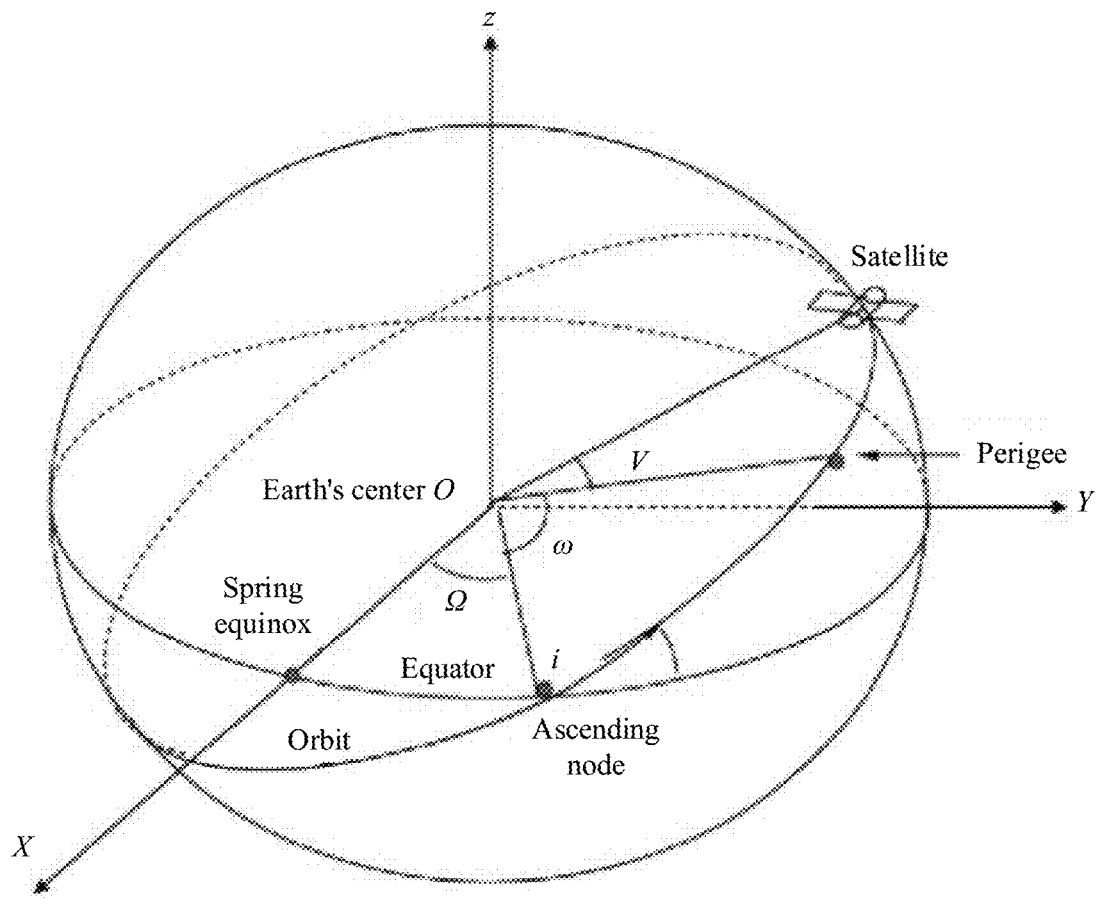
FIG. 4 is a schematic diagram of satellite orbit parameters.
Figure 5:
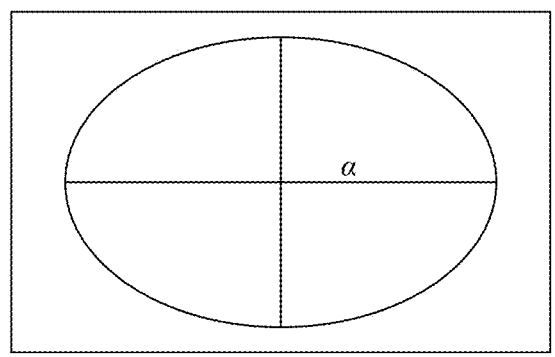
FIG. 5 is a schematic diagram of satellite orbit parameters.

FIG. 4 is a schematic diagram of satellite orbit parameters. FIG. 5 is a schematic diagram of satellite orbit parameters. Refer to FIG. 4 and FIG. 5. In a satellite network, a semi-major axis a of an orbit and an orbital eccentricity are determined by the satellite network. Therefore, a square root $\sqrt{a}$ of the semi-major axis of the orbit and the eccentricity e do not change. An argument of perigee is a geocentric angle between an ascending node and a perigee on an orbital plane. Therefore, the argument ω of perigee does not change. In addition, an orbital plane inclination angle $i_0$ at a reference moment and a longitude $\Omega_0$ of the ascending node are also determined by the satellite network. A mean anomaly $M_0$ at the reference moment is a time function, and the parameter determines an instantaneous position of a satellite in an orbit. Therefore, the parameter varies with the reference time.

As shown in FIG. 4 and FIG. 5, for some satellite networks in which orbital planes are evenly distributed and satellites on the orbital planes are evenly distributed, a position relationship between the satellites is relatively fixed. Such a satellite network may be, for example, a Walker constellation. The Walker constellation is used as an example. The Walker constellation has the following characteristics: Orbits are circular, orbital plane inclination angles are the same, ascending nodes are evenly spaced on orbital planes, satellites in the orbits are evenly spaced, and satellites between adjacent orbital planes are arranged at an equal phase interval. Therefore, for a satellite network such as the Walker constellation in which positions between satellites are relatively fixed, parameters, namely, a square root $\sqrt{a}$ of a semi-major axis of an orbit, an eccentricity e, an argument ω of perigee, an orbital plane inclination angle $i_0$ at a reference moment, and a longitude $\Omega_0$ of an ascending node that are in necessary ephemeris parameters, are determined by the satellite network. For a satellite in the satellite network, these parameters do not change. Therefore, in the embodiments of this application, the terminal device may obtain these parameters in a specific manner, and store these parameters in the terminal device. When the terminal device needs to determine position information of a satellite each time, the terminal device may directly use these parameters without requiring the satellite to send these parameters. In addition, the ephemeris reference moment $t_{0e}$ and the mean anomaly $M_0$ at the reference moment that are in the foregoing necessary ephemeris parameters change in an operating process of a satellite. Therefore, an ephemeris reference moment $t_{0e}$ and a mean anomaly $M_0$ at the reference moment may be sent by a satellite to the terminal device. The terminal device may determine position information of the currently observed satellite and other satellites in a satellite network based on the ephemeris reference moment $t_{0e}$ and the mean anomaly $M_0$ at the reference moment that are sent by the currently observed satellite and based on parameters that do not change and that are determined by the satellite network, so as to further obtain a topology of the satellite network.

The terminal device may obtain, through derivation according to Formula (1) to Formula (12), the position information of the currently observed satellite based on the foregoing ephemeris reference moment $t_{0e}$ and based on the square root $\sqrt{a}$ of the semi-major axis of the orbit, the eccentricity e, the argument ω of perigee, the orbital plane inclination angle $i_0$ at the reference moment, the longitude $\Omega_0$ of the ascending node, and the mean anomaly $M_0$ at the reference moment that are in the Keplerian orbit parameter. The position information is position coordinates $(X_k, Y_k, Z_k)$.

1. Calculate the semi-major axis according to Formula (1).

$$a = (\sqrt{a})^2 \quad (1)$$

2. Calculate an average angular velocity $n_0$ of the satellite according to Formula (2).

$$n_0 = \sqrt{\frac{GM}{a^3}} \quad (2)$$

3. Calculate a time difference $t_k$ between an observation moment t and the ephemeris reference moment $t_{0e}$ according to Formula (3).

$$t_k = t - t_{0e} \quad (3)$$

4. Calculate a mean anomaly $M_k$ according to Formula (4).

$$M_k = M_0 + n_0 t_k \quad (4)$$

5. Obtain an eccentric anomaly $E_k$ through iterative calculation according to Formula (5).

$$E_k = M_k + e \sin E_k \quad (5)$$

6. Calculate a true anomaly $f_k$ according to Formula (6).

$$\begin{cases} \cos f_k = \dfrac{(\cos E_k - e)}{(1 - e\cos E_k)} \\ \sin f_k = \dfrac{\sqrt{1-e^2}\sin E_k}{(1 - e\cos E_k)} \end{cases} \quad (6)$$

7. Calculate an argument of latitude parameter $\phi_k$ according to Formula (7).

$$\phi_k = f_k + \omega \quad (7)$$

8. Calculate a radius vector $r_k$ according to Formula (8).

$$r_k = a(1 - e \cos E_k) \quad (8)$$

9. Calculate coordinates $(x_k, y_k)$ of the satellite on an orbital plane according to Formula (9).

$$\begin{cases} x_k = r_k \cos\phi_k \\ y_k = r_k \sin\phi_k \end{cases} \quad (9)$$

10. Calculate a longitude $\Omega_k$ corresponding to a corrected ascending node according to Formula (10).

$$\Omega_k = \Omega_0 + (\dot{\Omega} - \dot{\Omega}_e)t_k - \dot{\Omega}_e t_{0e} \quad (10)$$

11. Calculate an orbital plane inclination angle i according to Formula (11).

$$i = i_0 + \delta i \quad (11)$$

12. Obtain the position information of the currently observed satellite through calculation according to Formula (12), where the position information is the position coordinates $(X_k, Y_k, Z_k)$.

$$\begin{cases} X_k = x_k \cos\Omega_k - y_k \cos i_0 \sin\Omega_k \\ Y_k = x_k \sin\Omega_k - y_k \cos i_0 \cos\Omega_k \\ Z_k = y_k \sin i_0 \end{cases} \quad (12)$$

For a satellite network such as the Walker constellation that has the following characteristics: Orbits are circular, orbital plane inclination angles are the same, ascending nodes are evenly spaced on orbital planes, satellites in the orbits are evenly spaced, and satellites between adjacent orbital planes are arranged at an equal phase interval, because the satellites in the satellite network are distributed at an equal interval on a same orbital plane, on the basis that the position information of the currently observed satellite is obtained through calculation, position information of other satellites on a same orbital plane as the currently observed satellite may be obtained through calculation based on a position interval between the satellites distributed on the orbital plane. In addition, different orbital planes in the satellite network are also distributed at an equal interval. Therefore, on the basis that position information of a satellite on one orbital plane is obtained through calculation, position information of satellites on other orbital planes may be obtained through calculation based on a position interval between the orbital planes, so as to obtain a topology of the satellite network.

For the foregoing ephemeris parameters that do not change and that are determined by the satellite network, the terminal device may obtain the ephemeris parameters in either of the following two manners.

In a first manner, at delivery of the terminal device, the ephemeris parameters that do not change are stored in the terminal device.

In a second manner, when the terminal device accesses a network for the first time, a satellite sends the ephemeris parameters that do not change to the terminal device, and the terminal device stores the ephemeris parameters.

That the terminal device accesses a network for the first time may mean that the terminal device accesses the network according to a random access process, or the terminal device is switched from one network to another network.

For the ephemeris parameters that may change and that include the ephemeris reference moment $t_{0e}$ and the mean anomaly $M_0$ at the reference moment, the terminal device may obtain the ephemeris parameters in either of the following two manners.

In a first manner, the satellite broadcasts the ephemeris parameters that may change to the terminal device according to a preset period.

In a second manner, when the terminal device needs to determine a topology of a satellite network by using ephemeris parameters, the terminal device requests the satellite to send the ephemeris parameters that may change.

The following details implementation processes of the foregoing various optional manners by using message exchange processes between a terminal device and a satellite.

Figure 6:
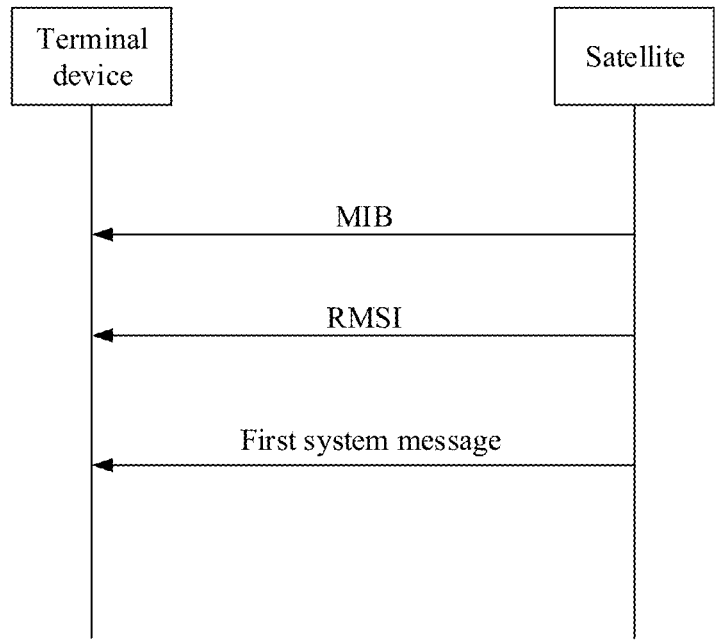
FIG. 6 is an interaction flowchart of Embodiment 1 of a communication method according to an embodiment of this application.

FIG. 6 is an interaction flowchart of Embodiment 1 of a communication method according to an embodiment of this application. As shown in FIG. 6, an interaction process between a terminal device and a satellite includes the following steps.

S601. The satellite sends a master system information block (MIB) to the terminal device.

The MIB includes basic information for accessing a network by the terminal device. By using the information, the terminal device may learn a manner of receiving remaining minimum system information (RMSI).

S602. The satellite sends the RMSI to the terminal device.

After learning the manner of receiving the RMSI, the terminal device receives, according to the receiving manner, the RMSI sent by the satellite.

The RMSI carries necessary information for accessing a network by the terminal device, including an uplink initial bandwidth part (BWP), a channel configuration in the initial BWP, a cell semi-static configuration, and the like.

S603. The satellite sends a first system message to the terminal device, where the first system message is used to indicate a mean anomaly of the currently observed satellite at an ephemeris reference moment.

Figure 7:
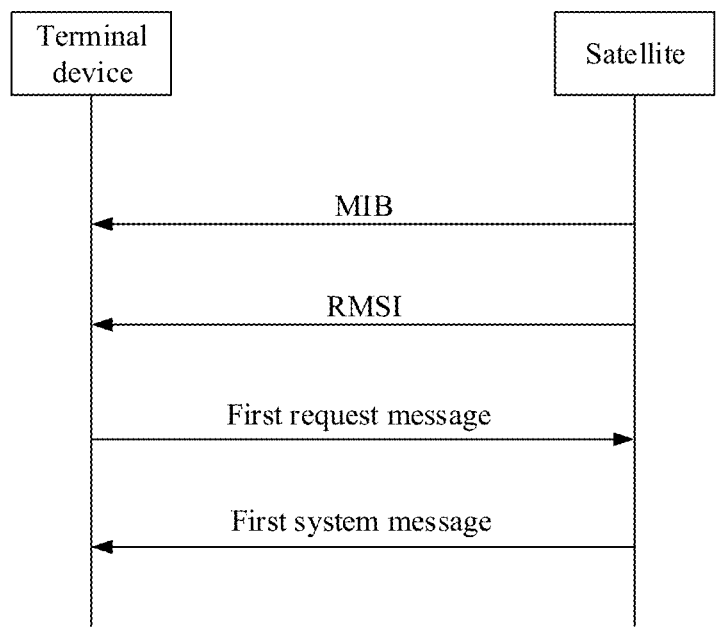
FIG. 7 is an interaction flowchart of Embodiment 2 of a communication method according to an embodiment of this application.

In this embodiment and the following process shown in FIG. 7, the satellite interacting with the terminal device is a satellite currently observed by the terminal device, and the currently observed satellite may be referred to as a first satellite.

In addition, in this embodiment of this application, "ephemeris reference moment" may be referred to as "reference moment" for short. For example, a mean anomaly of the satellite at a reference moment indicates a mean anomaly of the satellite at an ephemeris reference moment.

The first system message may carry the ephemeris reference moment $t_{0e}$ and the mean anomaly $M_0$ at the reference moment that are in necessary ephemeris parameters, and the first system message further carries an identifier of the satellite currently observed by the terminal device.

The terminal device may learn, based on the identifier of the satellite in the foregoing three parameters, which satellite in a satellite network is currently observed, and the terminal device may learn, based on the ephemeris reference moment $t_{0e}$ and the mean anomaly $M_0$ at the reference moment that are in the foregoing three parameters, the mean anomaly $M_0$ of the satellite at the reference time $t_{0e}$.

In addition to the foregoing three parameters, other necessary ephemeris parameters that do not change are all pre-stored in the terminal device. The terminal device may pre-store the other ephemeris parameters that do not change in the following manners: The terminal device pre-stores the other ephemeris parameters that do not change at delivery of the terminal device; or the terminal pre-stores the other ephemeris parameters that do not change to the terminal device sent by the satellite when the terminal device accesses the network for the first time.

A system message may include a MIB and a system information block (SIB). In this embodiment of this application, the SIB may be extended, and the extended SIB may be used as the first system message. The message carries the ephemeris reference moment $t_{0e}$, the mean anomaly $M_0$ at the reference moment, and the identifier of the satellite, to indicate the mean anomaly of the currently observed satellite at the reference moment.

For example, the ephemeris reference moment $t_{0e}$ carried in the first system message may include 16 bits, and a unit thereof is second; the mean anomaly $M_0$ at the reference moment may include 32 bits, and a value range thereof may be 0 degrees to 360 degrees; and the identifier of the satellite may include 16 bits, and a value range thereof may be 0 to 65535.

S604. The terminal device determines a topology of the satellite network based on the first system message and the pre-stored ephemeris parameters that do not change.

The satellite may broadcast the first system message according to a preset period.

For a specific method for determining the topology of the satellite network, refer to the foregoing description about determining the position information of the satellite according to Formula (1) to determine the topology of the satellite network. Details are not described herein again.

In this embodiment, the terminal device receives the first system message sent by the satellite according to the preset period, where the system message is used to indicate the mean anomaly of the currently observed satellite at the reference moment; and the terminal device may determine position information of the currently observed satellite and other satellites in the satellite network based on the first system message and the ephemeris parameters that do not change and that are pre-stored in the terminal device, so as to obtain the topology of the satellite network. The first system message is only used to indicate the mean anomaly of the currently observed satellite at the reference moment, or in other words, the first system message needs to carry only a relatively small quantity of parameters. Therefore, the terminal device can determine the topology of the satellite network by requiring only a relatively low latency and relatively low overheads, thereby satisfying requirements of a low latency and low overheads of a satellite communications system.

In Embodiment 1, the satellite proactively and periodically broadcasts the first system message according to the preset period. In another manner, the satellite sends the first system message to the terminal device after receiving a request message from the terminal device.

FIG. 7 is an interaction flowchart of Embodiment 2 of a communication method according to an embodiment of this application. As shown in FIG. 7, an interaction process between a terminal device and a satellite includes the following steps.

S701. The satellite sends a MIB to the terminal device.

An implementation process of this step is the same as that of step S601. For details, refer to step S601. Details are not described herein again.

S702. The satellite sends RMSI to the terminal device.

An implementation process of this step is the same as that of step S602. For details, refer to step S602. Details are not described herein again.

S703. The terminal device sends a first request message to the satellite.

The first request message is used to request the satellite to send a first system message for indicating a mean anomaly of the currently observed satellite at a reference moment.

Optionally, the first request message may be a system message, for example, a SIB message.

In an optional implementation, a timer may be set in the terminal device, and sending of the first request message is controlled by using the timer.

An initial value of the timer may be indicated by a network device to the terminal device when the terminal device is successfully registered with a network. For example, the terminal device initiates a registration request to a core network, and the core network adds the initial value of the timer to a registration accept message when returning, to the terminal device, the registration accept message indicating that registration succeeds.

When the terminal device is registered with the network, the timer controls sending of the first request message in the following manner.

After the terminal device receives the first system message, the timer resets the initial value, and starts timing.

After the timer expires, the terminal device is triggered to send the first request message to the satellite to request the satellite to send the first system message; and the terminal device terminates the timer.

When the terminal device is deregistered from the network, the timer is terminated.

S704. The satellite sends the first system message to the terminal device, where the first system message is used to indicate the mean anomaly of the currently observed satellite at the reference moment.

An implementation process of this step is the same as that of step S603. For details, refer to step S603. Details are not described herein again.

S705. The terminal device determines a topology of a satellite network based on the first system message and pre-stored ephemeris parameters that do not change.

An implementation process of this step is the same as that of step S604. For details, refer to step S604. Details are not described herein again.

In this embodiment, the terminal device proactively sends the first request message to the satellite; the satellite sends the first system message to the terminal device based on the first request message, where the first system message is used to indicate the mean anomaly of the currently observed satellite at the reference moment; and the terminal device may determine position information of the currently observed satellite and other satellites in the satellite network based on the first system message and the ephemeris parameters that do not change and that are pre-stored in the terminal device, so as to obtain the topology of the satellite network. The first system message is only used to indicate the mean anomaly of the currently observed satellite at the reference moment, or in other words, the first system message needs to carry only a relatively small quantity of parameters. Therefore, the terminal can determine the topology of the satellite network by requiring only a relatively low latency and relatively low overheads, thereby satisfying requirements of a low latency and low overheads of a satellite communications system.

In Embodiment 1 and Embodiment 2, the first system message is used to indicate the mean anomaly of the currently observed satellite at the reference moment. Specifically, the first system message may carry the ephemeris reference moment $t_{0e}$, the mean anomaly $M_0$ at the reference moment, and the identifier of the currently observed satellite. On this basis, in an optional implementation, the first system message may further carry an identifier of a satellite that has most recently been online and/or an identifier of a satellite that has most recently been offline.

After the terminal device is registered with the network, the terminal device may store a satellite list, where satellites in the satellite list are satellites that are currently in an online state. The terminal device may select, based on the satellite list, a suitable satellite for communication to initiate a service request, obtain user data, and the like. When operating statuses of some satellites in the satellite network change, for example, a satellite has just joined the satellite network, a satellite changes from an offline state to an online state, or a satellite changes from an online state to an offline state due to a fault, energy saving, or another reason, if the satellite list stored in the terminal device is not updated synchronously, the terminal device may fail to normally send a message or the like. Therefore, in the embodiments of this application, the first system message may be used, and the first system message carries the ephemeris reference moment $t_{0e}$, the mean anomaly $M_0$ at the reference moment, and the identifier of the currently observed satellite, and may further carry the identifier of the satellite that has most recently been online and/or the identifier of the satellite that has most recently been offline. After receiving the first system message, the terminal device may update the locally stored satellite list based on the identifier of the satellite that has most recently been online and/or the identifier of the satellite that has most recently been offline that are/is carried in the terminal device. In this way, operating statuses of satellites in the locally stored satellite list are the same as actual operating statuses of the satellites, thereby ensuring that the terminal device can normally communicate with the satellites.

In the foregoing embodiments, the terminal device receives the first system message from the satellite, where the first system message carries the ephemeris reference moment $t_{0e}$, the mean anomaly $M_0$ at the reference moment, and the identifier of the currently observed satellite. In other words, the first system message carries only the necessary ephemeris parameters that may change, and the other ephemeris parameters that do not change are locally pre-stored in the terminal device. As described above, the ephemeris parameters that do not change may be stored in the terminal device at delivery of the terminal device, or the ephemeris parameters that do not change may be stored in the terminal device when the terminal device accesses the network for the first time. The following describes a process in which the terminal device stores the ephemeris parameters that do not change in the terminal device when the terminal device accesses the network for the first time.

Figure 8:
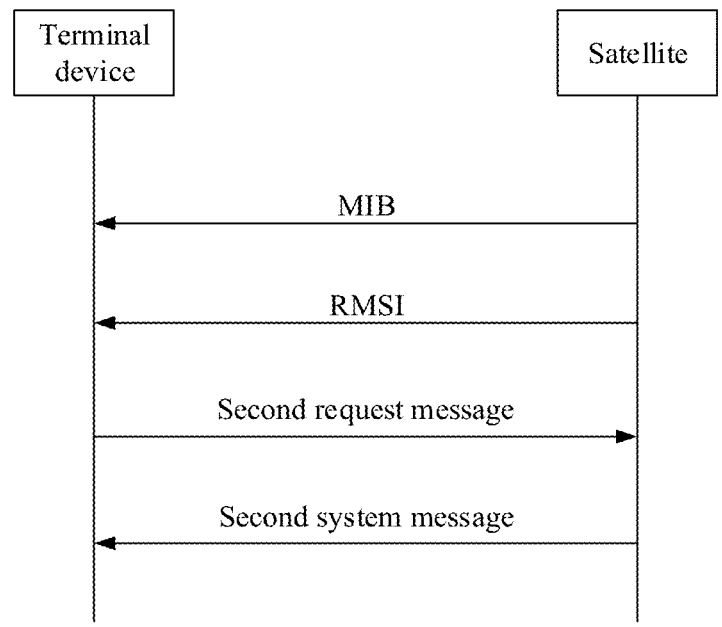
FIG. 8 is an interaction flowchart of Embodiment 3 of a communication method according to an embodiment of this application.

FIG. 8 is an interaction flowchart of Embodiment 3 of a communication method according to an embodiment of this application. In the following process, a satellite interacting with a terminal device is referred to as a second satellite. The second satellite is a satellite observed by the terminal device when the terminal device accesses a network for the first time, and the second satellite and the foregoing first satellite may be identical or different. As shown in FIG. 8, the interaction process between the terminal device and the satellite includes the following steps.

S801. The satellite sends a MIB to the terminal device.

The MIB includes basic information for accessing the network by the terminal device. By using the information, the terminal device may learn a manner of receiving RMSI.

S802. The satellite sends the RMSI to the terminal device.

After learning the manner of receiving the RMSI, the terminal device receives, according to the receiving manner, the RMSI sent by the satellite.

The RMSI carries necessary information for accessing the network by the terminal device, including an uplink initial BWP, a channel configuration in the initial BWP, a cell semi-static configuration, and the like.

S803. The terminal device sends a second request message to the satellite.

The second request message is used to request the satellite to send a second system message for indicating an ephemeris parameter of the satellite.

Optionally, the second system message may be a system message, for example, a SIB message.

For example, when the terminal device accesses the network for the first time, whether the terminal device stores the ephemeris parameter of the satellite is determined; and if the terminal device does not store the ephemeris parameter of the satellite, after receiving the RMSI sent by the satellite, the terminal device sends the second request message to the satellite according to this step, to request the satellite to send the second system message.

S804. The satellite sends the second system message to the terminal device.

The second system message is used to indicate the ephemeris parameter of the satellite.

First, the second system message may carry a square root $\sqrt{a}$ of a semi-major axis of an orbit, an eccentricity e, an argument $\omega$ of perigee, an orbital plane inclination angle $i_0$ at a reference moment, and a longitude $\Omega_0$ of an ascending node that do not change. After reading the parameters from the second system message, the terminal device stores these parameters in the terminal device. After the terminal device accesses the network and before the terminal device exits from the network, the terminal device may directly use these parameters.

In addition, the second system message may further carry the ephemeris reference moment $t_{0e}$, a mean anomaly $M_0$ at the reference moment, and an identifier of the currently observed satellite. The identifier of the currently observed satellite is an identifier of the second satellite. The ephemeris reference moment $t_{0e}$ and the mean anomaly $M_0$ at the reference moment have same meanings as those in the foregoing first system message, and details are not described herein again. Based on these parameters, the terminal device can determine a topology of a satellite network when accessing the network. On this basis, the terminal device may continuously obtain, based on the foregoing embodiments, the ephemeris reference moment $t_{0e}$ and the mean anomaly $M_0$ at the reference moment that constantly change, and continuously obtain an updated topology of the satellite network.

Moreover, optionally, the second system message may further carry a specific network parameter of the satellite network.

For example, the satellite network is a Walker constellation. The second system message may further carry the following specific parameters of the Walker constellation:

a quantity of satellites on each orbital plane, a quantity of constellation orbital planes, and a phase difference between adjacent orbital planes.

After obtaining and storing these specific network parameters, and after obtaining position information of the currently observed satellite through calculation by using the foregoing method and based on the square root $\sqrt{a}$ of the semi-major axis of the orbit, the eccentricity e, the argument $\omega$ of perigee, the orbital plane inclination angle $i_0$ at the reference moment, and the longitude $\Omega_0$ of the ascending node that do not change, the ephemeris reference moment $t_{0e}$ and the mean anomaly $M_0$ at the reference moment that may change, and the identifier of the currently observed satellite, the terminal device may determine a position interval between satellites on each orbital plane in the satellite network based on the quantity of satellites on the orbital plane in the foregoing specific parameters, and may further obtain position information of other satellites on the orbital plane through calculation based on the position interval between the satellites. Then, the terminal device may determine a position interval between orbital planes in the satellite network based on the quantity of constellation orbital planes and the phase difference between the adjacent orbital planes that are in the specific parameters, and may further obtain position information of satellites on other orbital planes through calculation based on the position interval between the orbital planes, so as to obtain the topology of the satellite network.

In addition, optionally, the second system message may further carry an identifier of a satellite that is currently in an online state.

The terminal device may generate, based on the identifier of the satellite that is currently in the online state, the satellite list described above. In a subsequent operating process of the terminal device, the terminal device may select a suitable satellite from the satellite list for communication to initiate a service request, obtain user data, and the like.

Optionally, the second system message may be a SIB.

S805. The terminal device determines the topology of the satellite network based on the second system message.

For a specific method for determining the topology of the satellite network, refer to the foregoing description about determining the position information of the satellite according to Formula (1) to determine the topology of the satellite network. Details are not described herein again.

In this embodiment, the terminal device sends the second request message to the satellite when accessing the network for the first time; the satellite sends the second system message to the terminal device based on the second request message, where the second system message carries the necessary ephemeris parameters of the satellite; and the terminal device may determine, based on the necessary ephemeris parameters, the position information of the currently observed satellite and the other satellites in the satellite network, so as to obtain the topology of the satellite network. When accessing the network for the first time, the terminal device obtains, based on the second system message, the necessary ephemeris parameters that do not change, and stores the necessary ephemeris parameters. Before exiting the network, the terminal device can directly use these parameters without obtaining these parameters from the satellite. In this way, a latency and overheads may be reduced, thereby satisfying requirements of a low latency and low overheads of a satellite communications system.

Figure 9:
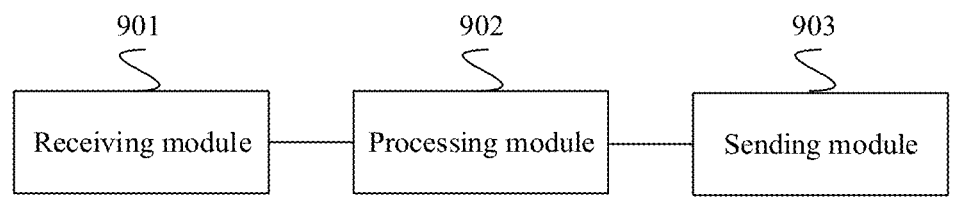
FIG. 9 is a module structural diagram of a satellite communications apparatus according to an embodiment of this application.

FIG. 9 is a module structural diagram of a satellite communications apparatus according to an embodiment of this application. The apparatus may be the terminal device described in the foregoing embodiment. Alternatively, the apparatus may be an apparatus that can support a terminal device in implementing a function of the terminal device in the method provided in the embodiments of this application. For example, the apparatus may be an apparatus or a chip system in the terminal device.

As shown in FIG. 9, the apparatus includes: a receiving module 901, configured to receive a first system message sent by a first satellite, where the first system message is used to indicate a mean anomaly of the first satellite at an ephemeris reference moment; and a processing module 902, configured to determine, based on the first system message, a topology of a satellite network to which the first satellite belongs.

In a possible implementation, the first system message includes an identifier of the first satellite, the ephemeris reference moment, and the mean anomaly of the first satellite at the ephemeris reference moment.

In a possible implementation, the first system message further includes an identifier of a satellite that is currently online and/or an identifier of a satellite that is currently offline.

Still refer to FIG. 9. In a possible implementation, the apparatus further includes:

a sending module 903, configured to send a first request message to the first satellite, where the first request message is used to request the first satellite to send the first system message.

In a possible implementation, the sending module 903 is configured to send a second request message to a second satellite, where the second request message is used to request to obtain ephemeris parameters of the second satellite. The receiving module 901 is further configured to receive a second system message sent by the second satellite, where the second system message is used to indicate the ephemeris parameters of the second satellite.

In a possible implementation, the second system message includes a square root of a semi-major axis of an orbit, an eccentricity, an argument of perigee, an orbital plane inclination angle at a reference moment, and a longitude of an ascending node that are of the satellite network.

In a possible implementation, the second system message further includes an identifier of the second satellite, the ephemeris reference moment, and a mean anomaly of the second satellite at the ephemeris reference moment.

Figure 10:
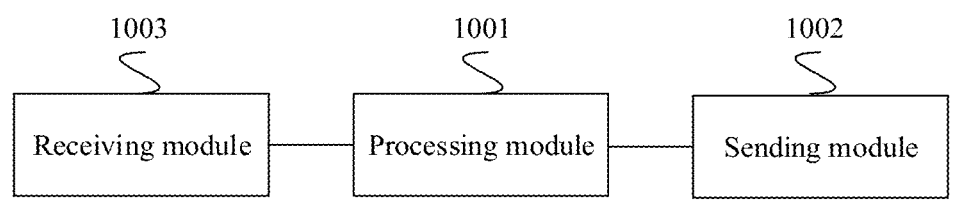
FIG. 10 is a module structural diagram of another satellite communications apparatus according to an embodiment of this application.

FIG. 10 is a module structural diagram of another satellite communications apparatus according to an embodiment of this application. The apparatus may be the satellite described in the foregoing embodiment. Alternatively, the apparatus may be an apparatus that can support a satellite in implementing a function of the satellite in the method provided in the embodiments of this application. For example, the apparatus may be an apparatus or a chip system in the satellite.

As shown in FIG. 10, the apparatus includes: a processing module 1001 and a sending module 1002.

The processing module 1001 is configured to send a first system message to a terminal device by using the sending module 1002, so that the terminal device determines, based on the first system message, a topology of a satellite network to which a first satellite belongs, where the first system message is used to indicate a mean anomaly of the first satellite at an ephemeris reference moment.

In a possible implementation, the first system message includes an identifier of the first satellite, the ephemeris reference moment, and the mean anomaly of the first satellite at the ephemeris reference moment.

In a possible implementation, the first system message further includes an identifier of a satellite that is currently online and/or an identifier of a satellite that is currently offline.

Still refer to FIG. 10. In a possible implementation, the apparatus further includes:

a receiving module 1003, configured to receive a first request message sent by the terminal device, where the first request message is used to request the first satellite to send the first system message. The sending module 1002 is specifically configured to send the first system message to the terminal device based on the first request message.

In a possible implementation, the receiving module 1003 is configured to receive a second request message sent by the terminal device, where the second request message is used to request to obtain ephemeris parameters of a second satellite. The sending module 1002 is further configured to send a second system message to the terminal device based on the second request message, where the second system message is used to indicate the ephemeris parameters of the second satellite.

In a possible implementation, the second system message includes a square root of a semi-major axis of an orbit, an eccentricity, an argument of perigee, an orbital plane inclination angle at a reference moment, and a longitude of an ascending node that are of the satellite network.

In a possible implementation, the second system message further includes an identifier of the second satellite, the ephemeris reference moment, and a mean anomaly of the second satellite at the ephemeris reference moment.

The satellite communications apparatus provided in this embodiment of this application can perform the method steps in the foregoing method embodiments. Implementation principles and technical effects of the satellite communications apparatus and the foregoing satellite communication method are similar, and details are not described herein again.

It should be noted and understood that division into the modules of the foregoing apparatus is merely logic function division. In actual implementation, a part or all of modules may be integrated into one physical entity, or the modules may be physically separated. In addition, all these modules may be implemented in a form of software invoked by a processing element, or may be implemented in a form of hardware. Alternatively, a part of modules may be implemented in a form of software invoked by a processing element, and a part of modules are implemented in a form of hardware. For example, a determining module may be an independently disposed processing element, or may be integrated in a chip of the foregoing apparatus for implementation. In addition, the determining module may alternatively be stored in a memory of the foregoing apparatus in a form of program code and invoked by a processing element of the foregoing apparatus to perform a function of the determining module. An implementation of another module is similar to the implementation of the determining module. In addition, all or a part of these modules may be integrated together, or may be implemented independently. The processing element described herein may be an integrated circuit, and has a signal processing capability. In an implementation process, steps in the foregoing methods or the foregoing modules can be implemented by using a hardware integrated logic circuit in the processing element, or by using instructions in a form of software.

For example, the foregoing modules may be configured as one or more integrated circuits for implementing the foregoing methods, such as one or more application-specific integrated circuits (ASICs), one or more digital signal processors (DSPs), or one or more field programmable gate arrays (FPGAs). For another example, when one of the foregoing modules is implemented in a form of program code invoked by a processing element, the processing element may be a general-purpose processor, for example, a central processing unit (CPU) or another processor that can invoke the program code. For still another example, these modules may be integrated together and implemented in a form of a system-on-a-chip (SOC).

All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer program instruction is loaded and executed on a computer, all or a part of the procedures or functions according to the embodiments of this application are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Figure 11:
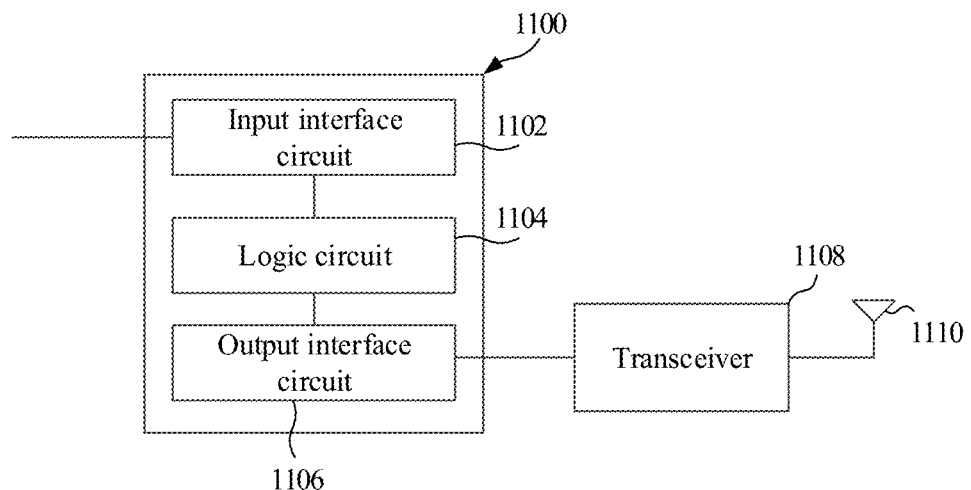
FIG. 11 is a module structural diagram of still another satellite communications apparatus according to an embodiment of this application.

Based on a same inventive concept as that of the satellite communication method provided in the foregoing embodiments of this application, an embodiment of this application further provides a satellite communications apparatus, configured to implement the satellite communication method in the foregoing embodiments. The satellite communication method in the foregoing embodiments may be partially or completely implemented by hardware or software. When the satellite communication method is implemented by hardware, as shown in FIG. 11, the satellite communications apparatus 1100 includes:

an input interface circuit 1102, a logic circuit 1104, and an output interface circuit 1106, and further includes a transceiver 1108 and an antenna 1110, where the transceiver 1108 performs data sending and receiving by using the antenna 1110.

The logic circuit 1104 is configured to perform the method steps performed by the terminal device or the satellite in the satellite communication method shown in FIG. 6 to FIG. 8. For details, refer to the descriptions in the foregoing method embodiments. Details are not described herein again. During specific implementation, the satellite communications apparatus 1100 may be a chip or an integrated circuit.

Figure 12:
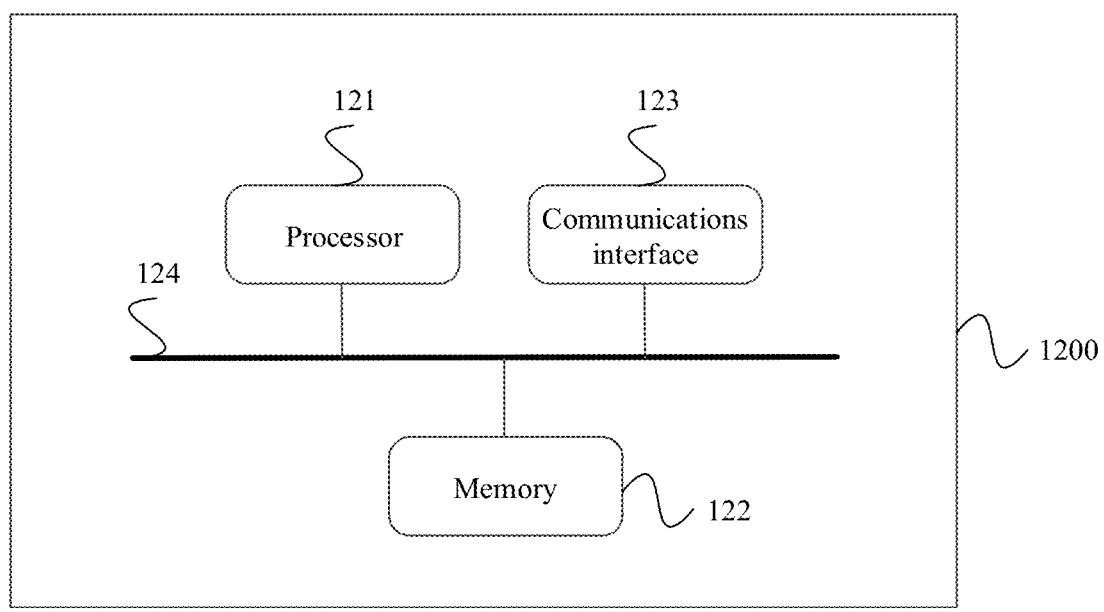
FIG. 12 is a schematic diagram of a structure of a terminal device according to an embodiment of this application.

FIG. 12 is a schematic diagram of a structure of a terminal device according to an embodiment of this application. As shown in FIG. 12, the terminal device 1200 may include a processor 121 (for example, a CPU), a memory 122, and a transceiver 123. The transceiver 123 is coupled to the processor 121, and the processor 121 controls sending and receiving operations of the transceiver 123. The memory 122 may store various instructions to complete various processing functions and implement the method steps performed by the terminal device in the embodiments of this application. Optionally, the terminal device in this embodiment of this application may further include a power supply 124, a system bus 125, and a communications interface 126. The transceiver 123 may be integrated into a transmitter receiver set of the terminal device, or may be an independent transceiver antenna of the terminal device. The system bus 125 is configured to implement communication connections between the components. The communications interface 126 is configured to implement connection and communication between the terminal device and another peripheral.

In this embodiment of this application, the processor 121 is configured to be coupled to the memory 122, and read and execute the instructions in the memory 122 to implement the method steps performed by the terminal device in the foregoing method embodiments. The transceiver 123 is coupled to the processor 121, and the processor 121 controls the transceiver 123 to perform message sending and receiving. Implementation principles and technical effects of the terminal device 1200 and the foregoing satellite communication method are similar, and details are not described herein again.

The system bus mentioned in FIG. 12 may be a peripheral component interconnect (PCI) bus, an extended industry standard architecture (EISA) bus, or the like. The system bus may be classified into an address bus, a data bus, a control bus, and the like. For ease of representation, only one thick line is used to represent the bus in the figure, but this does not mean that there is only one bus or only one type of bus. The communications interface is configured to implement communication between a database access apparatus and another device (such as a client, a read/write database, or a read-only database). The memory may include a random access memory (RAM), or may further include a non-volatile memory, for example, at least one magnetic disk memory.

The processor may be a general-purpose processor, including a central processing unit CPU, a network processor (NP), or the like; or may be a digital signal processor (DSP), an application-specific integrated circuit ASIC, a field programmable gate array FPGA or another programmable logic device, a discrete gate or a transistor logic device, or a discrete hardware component.

Figure 13:
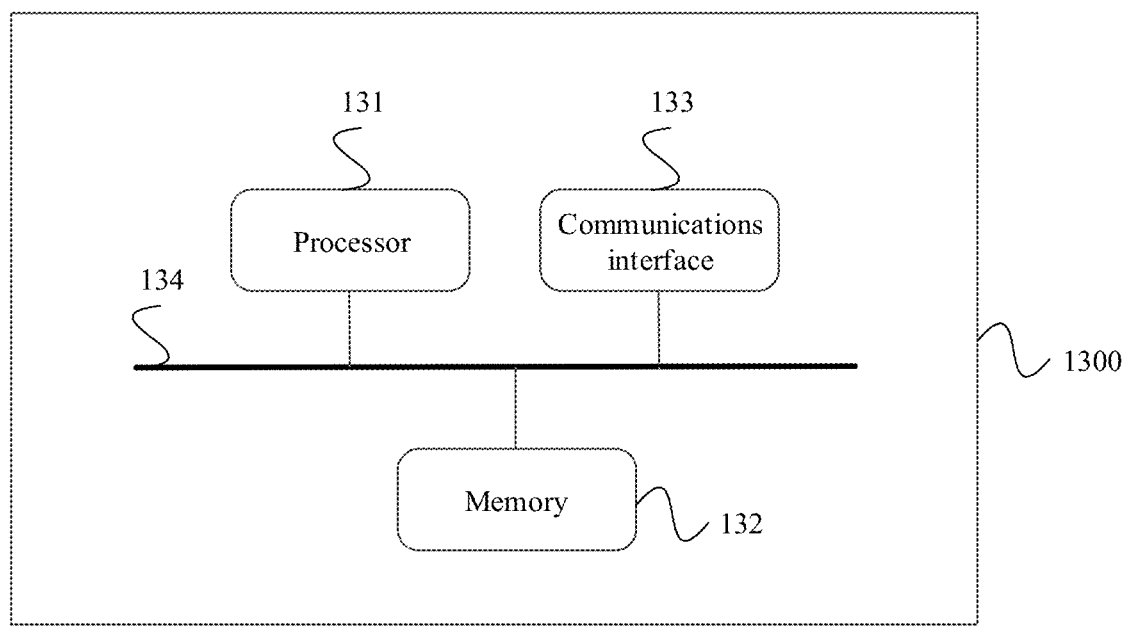
FIG. 13 is a schematic diagram of a structure of a satellite according to an embodiment of this application.

FIG. 13 is a schematic diagram of a structure of a satellite according to an embodiment of this application. As shown in FIG. 13, the satellite 1300 may include a processor 131 (for example, a CPU), a memory 132, and a transceiver 133. The transceiver 133 is coupled to the processor 131, and the processor 131 controls sending and receiving operations of the transceiver 133. The memory 132 may store various instructions to complete various processing functions and implement the method steps performed by the satellite in the embodiments of this application. Optionally, the satellite in this embodiment of this application may further include a power supply 134, a system bus 135, and a communications interface 136. The transceiver 133 may be integrated in a transmitter receiver set of the satellite, or may be an independent transceiver antenna on the satellite. The system bus 135 is configured to implement communication connections between the components. The communications interface 136 is configured to implement connection and communication between the satellite and another peripheral.

In this embodiment of this application, the processor 131 is configured to be coupled to the memory 132, and read and execute the instructions in the memory 132 to implement the method steps performed by the satellite in the foregoing method embodiments. The transceiver 133 is coupled to the processor 131, and the processor 131 controls the transceiver 123 to perform message sending and receiving. Implementation principles and technical effects of the satellite and the foregoing satellite communication method are similar, and details are not described herein again.

The system bus mentioned in FIG. 13 may be a PCI bus, an EISA bus, or the like. The system bus may be classified into an address bus, a data bus, a control bus, and the like. For ease of representation, only one thick line is used to represent the bus in the figure, but this does not mean that there is only one bus or only one type of bus. The communications interface is configured to implement communication between a database access apparatus and another device (such as a client, a read/write database, or a read-only database). The memory may include a RAM, or may further include a non-volatile memory, for example, at least one magnetic disk memory.

The processor may be a general-purpose processor, including a CPU, an NP, or the like; or may be a DSP, an ASIC, an FPGA or another programmable logic device, a discrete gate or a transistor logic device, or a discrete hardware component.

Optionally, an embodiment of this application further provides a computer-readable storage medium. The storage medium stores instructions. When the instructions are run on a computer, the computer is enabled to perform the processing process performed by the satellite or the processing process performed by the terminal device in the foregoing embodiments.

Optionally, an embodiment of this application further provides a chip for running instructions. The chip is configured to perform the processing process performed by the satellite or the processing process performed by the terminal device in the foregoing embodiments.

An embodiment of this application further provides a program product. The program product includes a computer program, and the computer program is stored in a storage medium. At least one processor may read the computer program from the storage medium, and the at least one processor performs the processing process performed by the satellite or the processing process performed by the terminal device in the foregoing embodiments.

In the embodiments of this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists. A and B may be singular or plural. The character "I" generally indicates an "or" relationship between the associated objects. In a formula, the character "I" indicates a "division" relationship between the associated objects. "At least one of the following items (pieces)" or a similar expression thereof means any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural.

It may be understood that various numbers in the embodiments of this application are merely used for differentiation for ease of description, but are not used to limit the scope of the embodiments of this application.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

What is claimed is:

1. A satellite communication method, comprising:
    receiving a first system message sent by a first satellite in a satellite network, wherein the first system message comprises an identifier of the first satellite, an ephemeris reference time, and a mean anomaly of the first satellite to indicate the mean anomaly of the first satellite at the ephemeris reference time;
    determining, based on the first system message, position information of the first satellite and other satellites in the satellite network; and
    determining, based on the position information, a topology of the satellite network.

2. The method according to claim 1, wherein the first system message further comprises at least one of an identifier of a satellite that is currently online or an identifier of a satellite that is currently offline.

3. The method according to claim 1, the method further comprises: before receiving the first system message, sending a first request message to the first satellite, wherein the first request message requests the first satellite to send the first system message.

4. The method according to claim 1, wherein the method further comprises:
    before receiving the first system message, sending a second request message to a second satellite, wherein the second request message requests to obtain ephemeris parameters of the second satellite; and
    receiving a second system message sent by the second satellite, wherein the second system message indicates the ephemeris parameters of the second satellite.

5. The method according to claim 4, wherein the second system message comprises a square root of a semi-major axis of an orbit, an eccentricity, an argument of perigee, an orbital plane inclination angle at a reference time, and a longitude of an ascending node that are of the satellite network.

6. The method according to claim 5, wherein the second system message further comprises an identifier of the second satellite, an ephemeris reference time of the second satellite, and a mean anomaly of the second satellite at the ephemeris reference time of the second satellite.

7. A terminal device, comprising at least one processor coupled to one or more memories, wherein the at least one processor executes instructions stored in the one or more memories to cause the terminal device to perform operations comprising:
    receiving a first system message sent by a first satellite in a satellite network, wherein the first system message comprises an identifier of the first satellite, an ephemeris reference time, and a mean anomaly of the first satellite to indicate the mean anomaly of the first satellite at the ephemeris reference time;
    determining, based on the first system message, position information of the first satellite and other satellites in the satellite network; and
    determining, based on the position information, a topology of the satellite network.

8. The terminal device according to claim 7, wherein the first system message further comprises at least one of an identifier of a satellite that is currently online or an identifier of a satellite that is currently offline.

9. The terminal device according to claim 7, wherein the operations further comprise: before receiving the first system message, sending a first request message to the first satellite, wherein the first request message requests the first satellite to send the first system message.

10. The terminal device according to claim 7, wherein the operations further comprise: before receiving the first system message, sending a second request message to a second satellite, wherein the second request message requests to obtain ephemeris parameters of the second satellite; and receiving a second system message sent by the second satellite, wherein the second system message indicates the ephemeris parameters of the second satellite.

11. The terminal device according to claim 10, wherein the second system message comprises a square root of a semi-major axis of an orbit, an eccentricity, an argument of perigee, an orbital plane inclination angle at a reference time, and a longitude of an ascending node that are of the satellite network.

12. The terminal device according to claim 11, wherein the second system message further comprises an identifier of the second satellite, the ephemeris reference time of the second satellite, and a mean anomaly of the second satellite at the ephemeris reference time of the second satellite.

13. A non-transitory computer-readable storage medium storing computer instructions that when executed by a computer, cause the computer to perform operations comprising:
- receiving a first system message sent by a first satellite in a satellite network, wherein the first system message comprises an identifier of the first satellite, an ephemeris reference time, and a mean anomaly of the first satellite to indicate the mean anomaly of the first satellite at the ephemeris reference time;
- determining, based on the first system message, position information of the first satellite and other satellites in the satellite network; and
- determining, based on the position information, a topology of the satellite network.

14. The non-transitory computer-readable storage medium according to claim 13, wherein the first system message further comprises at least one of an identifier of a satellite that is currently online/or an identifier of a satellite that is currently offline.

15. The non-transitory computer-readable storage medium according to claim 13, wherein the operations further comprise:
- before receiving the first system message, sending a first request message to the first satellite, wherein the first request message requests the first satellite to send the first system message.

16. The non-transitory computer-readable storage medium according to claim 13, wherein the operations further comprise:
- before receiving the first system message, sending a second request message to a second satellite, wherein the second request message requests to obtain ephemeris parameters of the second satellite; and
- receiving a second system message sent by the second satellite, wherein the second system message indicates the ephemeris parameters of the second satellite.

17. The non-transitory computer-readable storage medium according to claim 16, wherein the second system message comprises a square root of a semi-major axis of an orbit, an eccentricity, an argument of perigee, an orbital plane inclination angle at a reference time, and a longitude of an ascending node that are of the satellite network.

* * * * *

UNITED STATES PATENT AND TRADEMARK OFFICE
CERTIFICATE OF CORRECTION

| | | |
|---|---|---|
| PATENT NO. | : 11,962,396 B2 | |
| APPLICATION NO. | : 17/570212 | |
| DATED | : April 16, 2024 | |
| INVENTOR(S) | : Yunfei Qiao, Rong Li and Yu Wang | |

It is certified that error appears in the above-identified patent and that said Letters Patent is hereby corrected as shown below:

In the Claims

Column 26, Line 4, Claim 14, please delete "online/or" and insert therefore -- online or --.

Signed and Sealed this
Twenty-seventh Day of August, 2024

Katherine Kelly Vidal
*Director of the United States Patent and Trademark Office*